United States Patent
Wu et al.

(10) Patent No.: US 10,923,916 B2
(45) Date of Patent: Feb. 16, 2021

(54) STOCHASTIC DYNAMICAL UNIT COMMITMENT METHOD FOR POWER SYSTEM BASED ON SOLVING QUANTILES VIA NEWTON METHOD

(71) Applicants: TSINGHUA UNIVERSITY, Beijing (CN); STATE GRID CORPORATION OF CHINA, Beijing (CN)

(72) Inventors: Wenchuan Wu, Beijing (CN); Bin Wang, Beijing (CN); Mingjie Li, Beijing (CN); Hongbin Sun, Beijing (CN); Qinglai Guo, Beijing (CN); Yue Yang, Beijing (CN); Shuwei Xu, Beijing (CN)

(73) Assignees: TSINGHUA UNIVERSITY, Beijing (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 16/542,651

(22) Filed: Aug. 16, 2019

(65) Prior Publication Data

US 2020/0266631 A1 Aug. 20, 2020

(30) Foreign Application Priority Data

Feb. 19, 2019 (CN) .......................... 201910121924.X

(51) Int. Cl.
*H02J 3/38* (2006.01)
*G05B 17/02* (2006.01)

(52) U.S. Cl.
CPC .............. *H02J 3/382* (2013.01); *G05B 17/02* (2013.01); *H02J 2203/20* (2020.01)

(58) Field of Classification Search
CPC ........ H02J 3/382; H02J 2203/20; G05B 17/02
See application file for complete search history.

(56) References Cited

U.S. PATENT DOCUMENTS

| 7,203,622 B2* | 4/2007 | Pan | H02J 3/00 702/184 |
|---|---|---|---|
| 2004/0158772 A1* | 8/2004 | Pan | H02J 3/00 714/14 |
| 2005/0246039 A1* | 11/2005 | Iino | G05B 13/048 700/29 |

* cited by examiner

*Primary Examiner* — Charles R Kasenge
(74) *Attorney, Agent, or Firm* — Hodgson Russ LLP

(57) ABSTRACT

The disclosure provides a stochastic dynamical unit commitment method for power system based on solving quantiles via Newton method, belonging to power system technologies. The method establishes a unit commitment model with chance constraints for power system parameters. Quantiles of random variables obeying mixed Gaussian distribution is solved by Newton method, and chance constraints are transformed into deterministic linear constraints, so that original problem is transformed into mixed integer linear optimization problem. Finally, the model is solved to obtain on-off strategy and active power plan of units. The disclosure employs Newton method to transform chance constraints containing risk level and random variables into deterministic mixed integer linear constraints, which effectively improves the model solution efficiency, eliminates conservative nature of conventional robust unit commitment, provides reasonable dispatch basis for decision makers. The disclosure is employed to the stochastic and dynamic unit commitment of the power system including large-scale renewable energy grid-connected.

1 Claim, No Drawings

STOCHASTIC DYNAMICAL UNIT COMMITMENT METHOD FOR POWER SYSTEM BASED ON SOLVING QUANTILES VIA NEWTON METHOD

CROSS-REFERENCE TO RELATED APPLICATION

This application claims priority to Chinese Patent Application No. 201910121924.X, filed Feb. 19, 2019, the entire disclosure of which is incorporated herein by reference.

TECHNICAL FIELD

The present disclosure relates to a stochastic dynamical unit commitment method for a power system based on solving quantiles via Newton method, belonging to the field of power system operation technologies.

BACKGROUND

The development and utilization of wind power resources and the realization of energy sustainability are major initiatives in energy development strategy. With the large-scale access of renewable energy to the power grid, its volatility and stochastic pose two problems for the unit commitment in the power system operation.

On the one hand, an accurate and flexible prediction on an active power of renewable energy is the basis for realizing the safe and economical unit commitment. Conventional prediction methods include an interval description method with given upper and lower limits of the active power, and a description method of simple Gaussian probability density function. Although models such as beta distribution and versatile distribution, may be also employed in the prediction of the active power of the renewable energy, they may not accurately fit the renewable energy to predict the active power, or bring great difficulties for solution the unit commitment model. Therefore, it needs to employ an accurate and flexible prediction model.

On the other hand, the volatility and stochastic of the renewable energy make conventional deterministic unit commitment methods difficult to be applied. Robust models may be feasible. However, due to the conservative nature of robust optimization, it will bring unnecessary costs to the system operation. The stochastic unit commitment with chance constraints is an effective modeling strategy that takes into account system operation risk and cost reduction. This method limits the probability of occurrence of the risk to a predetermined confidence level, and obtains the lowest cost dispatch strategy by minimizing a value of an objective function. However, the existence of random variables in the constraints makes the solution of the chance constrained optimization problems very difficult. The existing solution methods generally have the disadvantage of large computational complexity. However, the relaxation solution method makes solution results less accurate and cannot achieve the efficient unit commitment.

In summary, the modeling and rapid solution of the stochastic dynamical unit commitment considering the stochastic of the active power of the renewable energy is still a major problem affecting the utilization of renewable energy.

SUMMARY

The object of the present disclosure is to propose a stochastic dynamical unit commitment method for a power system based on solving quantiles via Newton method. An active power of renewable energy is accurately fitted based on mixed Gaussian distribution, and quantiles of random variables may be solved based on Newton method, thereby transforming chance constraints into deterministic mixed integer linear constraints, which makes full use of the advantages of stochastic unit commitment with chance constraints, effectively reduces the system risk and saves the cost of power grid operation.

The stochastic dynamical unit commitment method for a power system based on solving quantiles via Newton method may include the following steps.

(1) A stochastic dynamical unit commitment model with chance constraints based on solving quantiles of random variables via Newton method is established. The stochastic and dynamic unit commitment model includes an objective function and constraints. The establishing may include the following steps.

(1-1) The objective function of the stochastic dynamical unit commitment model with chance constraints based on solving quantiles of random variables via Newton method is established.

The objective function is to minimize a sum of power generation costs and on-off costs of thermal power generating units. The objective function is denoted by a formula of:

$$\min \sum_{t=1}^{T} \left[ \sum_{i=1}^{N_G} (CF_i(P_i^t) + CU_i^t + CD_i^t) \right],$$

where, T denotes the number of dispatch intervals; $N_G$ denotes the number of thermal power generating units in the power system; t denotes a serial number of dispatch intervals; i denotes a serial number of thermal power generating units; $P_i^t$ denotes an active power of thermal power generating unit i at dispatch interval t; $CF_i$ denotes a fuel cost function of thermal power generating unit i; $CU_i^t$ denotes a startup cost of thermal power generating unit i at dispatch interval t; and $CD_i^t$ denotes a shutdown cost of thermal power generating unit i at dispatch interval t.

(1-1) The fuel cost function of the thermal power generating unit is expressed as a quadratic function of the active power of the thermal power generating unit, Which is denoted by a formula of:

$$CF_i(P_i^t) = a_i(P_i^t)^2 + b_i P_i^t + c_i,$$

where, $a_i$ denotes a quadratic coefficient of a fuel cost of thermal power generating unit i; $b_i$ denotes a linear coefficient of the fuel cost of thermal power generating unit i; $c_i$ denotes a constant coefficient of the fuel cost of thermal power generating unit i; and values of $a_i$, $b_i$, and $c_i$ may be obtained from a dispatch center.

The startup cost of the thermal power generating unit, and the shutdown cost of the thermal power generating unit are denoted by formulas of:

$$CU_i^t \geq U_i(v_i^t - v_i^{t-1})$$

$$CU_i^t \geq 0,$$

$$CD_i^t \geq D_i(v_i^{t-1} - v_i^t)$$

$$CD_i^t \geq 0$$

where, $v_i^t$ denotes a state of thermal power generating unit i at dispatch interval t; if $v_i^t = 0$, it represents that thermal power generating unit i is in an off state; if $v_i^t=1$, it represents that thermal power generating unit i is in an on state; it is set that there is the startup cost when the unit is switched from the off state to the on stale, and there is the shutdown cost when the unit is switched from the on state to the off state; $U_i$ denotes a startup cost when the thermal power generating unit i is turned on one time; and $D_i$ denotes a shutdown cost when the thermal power generating unit i is turned off one time.

(1-2) Constraints of the stochastic dynamical unit commitment model with chance constraints based on solving quantiles of random variables via Newton method may include the following.

(1-2-1) A power balance constraint of the power system, which is denoted by a formula of:

$$\sum_{i=1}^{N_G} P_i^t + \sum_{j=1}^{N_W} w_j^t = \sum_{m=1}^{N_D} d_m^t,$$

where, $P_i^t$ denotes a scheduled active power of thermal power generating unit i at dispatch interval t; $w_j^t$ denotes a scheduled active power of renewable energy power station j at dispatch interval t; $d_m^t$ denotes a size of load m at dispatch interval t; and $N_D$ denotes the number of loads in the power system.

(1-2-2) An upper and lower constraint of the active power of the thermal power generating unit in the power system, which is denoted by a formula of:

$$\underline{P}_i v_i^t \leq P_i^t \leq \overline{P}_i v_i^t,$$

where, $\underline{P}_i$ denotes an active power lower limit of thermal power generating unit i; $\overline{P}_i$ an active power upper limit of thermal power generating unit i; $v_i^t$ denotes the state of thermal power generating unit i at dispatch interval t; if $v_i^t=0$, it represents that thermal power generating unit i is in an on state; and if $v_i^t=1$, it represents that thermal power generating unit i is in an off state (1-2-3) A reserve constraint of the thermal power generating unit in the power system, which is denoted by a formula of:

$$P_i^t + r_i^{t+} \leq \overline{P}_i v_i^t$$

$$0 \leq r_i^{t+} \leq \bar{r}_i^+,$$

$$P_i^t - r_i^{t-} \geq \underline{P}_i v_i^t$$

$$0 \leq r_i^{t-} \leq \bar{r}_i^-$$

where, $r_i^{t+}$ denotes an upper reserve of thermal power generating unit i at dispatch interval t; $r_i^{t-}$ denotes a lower reserve of thermal power generating unit i at dispatch interval t; $\bar{r}_i^+$ denotes a maximum upper reserve of thermal power generating unit i at dispatch interval t; $\bar{r}_i^-$ denotes a maximum lower reserve of thermal power generating unit i at dispatch interval t; and the maximum upper reserve and the maximum lower reserve may be obtained from the dispatch center of the power system.

(1-2-4) A ramp constraint of the thermal power generating unit in the power system, which is denoted by a formula of:

$$P_i^t - P_i^{t-1} \geq -RD_i \Delta T - (2 - v_i^t - v_i^{t-1}) \overline{P}_i,$$

$$P_i^t - P_i^{t-1} \leq RU_i \Delta T + (2 - v_i^t - v_i^{t-1}) \overline{P}_i$$

where, $RU_i$ denotes upward ramp capacities of thermal power generating unit i, and $RD_i$ denotes downward ramp capacities of thermal power generating unit i, which are obtained from the dispatch center; and $\Delta T$ denotes an interval between two adjacent dispatch intervals.

(1-2-5) A constraint of a minimum continuous on-off period of the thermal power generating unit in the power system, and the expression is as follows.

A minimum interval for power-on and power-off switching of the thermal power generating unit is denoted by a formula of:

$$\sum_{t=k}^{k+UT_i-1} v_i^t \geq UT_i(v_i^k - v_i^{k-1}), \forall k = 2, \ldots, T - UT_i + 1$$

$$\sum_{t=k}^{T} \{v_i^t - (v_i^k - v_i^{k-1})\} \geq 0, \forall k = T - UT_i + 2, \ldots, T$$

$$\sum_{t=k}^{k+DT_i-1} (1 - v_i^t) \geq DT_i(v_i^{k-1} - v_i^k), \forall k = 2, \ldots, T - DT_i + 1$$

$$\sum_{t=k}^{T} \{1 - v_i^t - (v_i^{k-1} - v_i^k)\} \geq 0, \forall k = T - DT_i + 2, \ldots, T,$$

where, $UT_i$ denotes a minimum continuous startup period, and $DT_i$ denotes a minimum continuous shutdown period.

(1-2-6) A reserve constraint of the power system, which is denoted by a formula of:

$$Pr\left(\sum_{i=1}^{N_G} r_i^{t+} \geq \sum_{j=1}^{N_W} w_j^t - \sum_{j=1}^{N_W} \tilde{w}_j^t + R^+\right) \geq 1 - \varepsilon_r^+$$

$$Pr\left(\sum_{i=1}^{N_G} r_i^{t-} \geq \sum_{j=1}^{N_W} \tilde{w}_j^t - \sum_{j=1}^{N_W} w_j^t + R^-\right) \geq 1 - \varepsilon_r^-,$$

where, $\tilde{w}_j^t$ denotes an actual active power of renewable energy power station j at dispatch interval t; $w_j^t$ denotes a scheduled active power of renewable energy power station j at dispatch interval t; $R^+$ and $R^-$ denote additional reserve demand representing the power system from the dispatch center; $\varepsilon_r^+$ denotes a risk of insufficient upward reserve in the power system; $\varepsilon_r^-$ denotes a risk of insufficient downward reserve in the power system; and $Pr(\cdot)$ denotes a probability of occurrence of insufficient upward reserve and a probability of occurrence of insufficient downward reserve. The probability of occurrence of insufficient upward reserve and the probability of occurrence of insufficient downward reserve may be obtained from the dispatch center.

(1-2-7) A branch flow constraint of the power system, which is denoted by a formula of:

$$Pr\left(\sum_{i=1}^{N_G} G_{l,i} P_i^t + \sum_{j=1}^{N_W} G_{l,j} \tilde{w}_j^t - \sum_{k=1}^{N_D} G_{l,m} d_m^t \leq L_l\right) \geq 1 - \eta$$

$$Pr\left(\sum_{i=1}^{N_G} G_{l,i} P_i^t + \sum_{j=1}^{N_W} G_{l,j} \tilde{w}_j^t - \sum_{k=1}^{N_D} G_{l,m} d_m^t \geq -L_l\right) \geq 1 - \eta,$$

where, $G_{l,i}$ denotes a power transfer distribution factor of branch l to the active power of thermal power generating unit i; $G_{l,j}$ denotes a power transfer distribution factor of branch l to the active power of renewable energy power station j; $G_{l,m}$ denotes a power transfer distribution factor of branch l to load m; each power transfer distribution factor may be obtained from the dispatch center; $L_t$ denotes an active power upper limit on branch l; and η denotes a risk level of an active power on the branch of the power system exceeding a rated active power upper limit of the brand), which is determined by a dispatcher.

(2) Based on the objective function and constraints of the stochastic and dynamic unit commitment model, the Newton method is employed to solve quantiles of random variables, which may include the following steps.

(2-1) The chance constraints are converted into deterministic constraints containing quantiles.

A general form of the chance constraints is denoted by a formula of:

$$Pr(c^T \tilde{w}^t + d^T x \leq e) \geq 1-p,$$

where, c and d denote constant vectors with $N_W$ dimension in the chance constraints; $N_W$ denotes the number of renewable energy power stations in the power system; e denotes constants in the chance constraints; p denotes a risk level of the chance constraints, which is obtained from the dispatch center in the power system; $\tilde{w}^t$ denotes an actual active power vector of all renewable energy power stations at dispatch interval t; and x denotes a vector consisting of decision variables, and the decision variables are scheduled active powers of the renewable energy power stations and the thermal power generating units.

The above general form of the chance constraints is converted to the deterministic constraints containing the quantiles by a formula of:

$$e - d^T x \geq CDF^{-1}_{c^T \tilde{w}^t}(1-p), \text{ where, } CDF^{-1}_{c^T \tilde{w}^t}(1-p)$$

denotes quantiles when a probability of one-dimensional random variables $c^T \tilde{w}^t$ is equal to 1−p.

(2-2) A joint probability distribution of the actual active powers of all renewable energy power stations in the power system is set to satisfy the following Gaussian mixture model:

$$\tilde{w}^t = \{\tilde{w}^t_j \mid 1 \leq j \leq N_W\}$$

$$PDF_{\tilde{w}^t}(Y) = \sum_{s=1}^{n} \omega_s N(Y, \mu_s, \Sigma_s), \omega_s \geq 0$$

$$N\left(Y \mid \mu_s, \sum_s\right) = \frac{1}{(2\pi)^{N_W/2} \det(\sum_s)^{1/2}} e^{-\frac{1}{2}(Y-\mu_s)^T \Sigma_s^{-1}(Y-\mu_s)},$$

where, $\tilde{w}^t$ denotes a set of scheduled active powers of all renewable enemy power stations in the power system; $\tilde{w}^t$ is a stochastic vector;

$$PDF_{\tilde{w}_t}(\cdot)$$

denotes a probability density function of the stochastic vector; Y denotes values of $\tilde{w}^t$; $N(Y, \mu_s, \Sigma_s)$ denotes the $s^{-th}$ component of the mixed Gaussian distribution; n denotes the number of components of the mixed Gaussian distribution; $\omega_s$ denotes a weighting coefficient representing the $s^{-th}$ component of the mixed Gaussian distribution and a sum of weighting coefficients of all components is equal to 1; $\mu_s$ denotes an average vector of the $s^{-th}$ component of the mixed Gaussian distribution; $\Sigma_s$ denotes a covariance matrix of the $s^{-th}$ component of the mixed Gaussian distribution; $\det(\Sigma_s)$ denotes a determinant of the covariance matrix $\Sigma_s$; and a superscript T indicates a transposition of matrix.

Thus, a nonlinear equation containing the quantiles $$CDF^{-1}_{c^T \tilde{w}^t}(1-p)$$

is obtained as follows:

$$\sum_{s=1}^{n} \omega_s \Phi\left(\frac{y - c^T \mu_s}{\sqrt{c^T \Sigma_s c}}\right) - (1-p) = 0,$$

where, $\Phi(\cdot)$ denotes a cumulative distribution function representing a one-dimensional standard Gaussian distribution; y denotes a simple expression representing the quantile;

$$y = CDF^{-1}_{c^T \tilde{w}^t}(1-p);$$

and $\mu_s$ denotes an average vector of the $s^{-th}$ component of the mixed. Gaussian distribution.

(2-3) Employing the Newton method, the nonlinear equation of step (2-2) is iteratively solved to obtain the quantiles $$CDF^{-1}_{c^T \tilde{w}^t}(1-p)$$

of the random variables $c^T \tilde{w}^t$. The specific algorithm steps are as follows.

(2-3-1) Initialization

An initial value of y is set to $y_0$, which is denoted by a formula of:

$$y_0 = \max(c^T \mu_i, i \in \{1, 2, \ldots, N_W\}).$$

(2-3-2) Iteration

A value of y is updated by a formula of:

$$y_{k+1} = y_k - \frac{CDF^{-1}_{c^T \tilde{w}^t}(y_k) - (1-p)}{PDF_{c^T \tilde{w}^t}(y_k)}, \text{ where, } CDF^{-1}_{c^T \tilde{w}^t}(y_k)$$

denotes quantiles when a probability of one-dimensional random variables $c^T \tilde{w}^t$ is equal to 1−p; $y_k$ denotes a value of y of a previous iteration; $y_{k+1}$ denotes a value of y of a current iteration, which is to be solved; and $$PDF_{c^T \tilde{w}^t}$$

denotes a probability density function representing the stochastic vector $c^T \tilde{w}^t$, which is denoted by a formula of:

$$PDF_{c^T\tilde{w}^t}(y) = \sum_{s=1}^{n} \omega_s \frac{1}{\sqrt{2\pi c^T \sum_s c}} e^{-\frac{(y-c^T\mu_s)^2}{2c^T\Sigma_s c}}.$$

2-3-3) An allowable error of the iterative calculation ε is set; an iterative calculation result is judged based on the allowable error. If $$|CDF^{-1}_{c^T\tilde{w}^t}(y_{k+1}) - (1-p)| \le \varepsilon,$$

it is determined that the iterative calculation converges, and values of the quantiles $$CDF^{-1}_{c^T\tilde{w}^t}(1-p)$$

of the random variables are obtained; and if $$|CDF^{-1}_{c^T\tilde{w}^t}(y_{k+1}) - (1-p)| > \varepsilon,$$

it is returned to (2-2-2).

(3) An equivalent form $$CDF^{-1}_{c^T\tilde{w}^t}(1-p)$$

of the chance constraints in the step (1-2-6) and the step (1-2-7) may be obtained based on $$CDF^{-1}_{c^T\tilde{w}^t}(1-p)$$

in the step (2); using z branch and bound method, the stochastic unit commitment model including the objective function and the constraints in the step (1) is solved to obtain $v_i^t$, $P_i^t$, and $w_j^t$. $v_i^t$ is taken as a starting and stopping state of thermal power generating unit i at dispatch interval t; $P_i^t$ is taken as a scheduled active power of renewable energy power station j at dispatch interval t; and $w_j^t$ is taken as a reference active power of renewable energy power station j at dispatch interval t. Therefore, the stochastic and dynamic unit commitment with chance constraints may be solved based on Newton method for solving quantiles of random variables.

The stochastic dynamical unit commitment method for a power system based on solving quantiles via Newton method, provided in the present disclosure, may have the following advantages.

The method of the present disclosure first accurately describes the active power characteristics and correlations of renewable energy predictions such as wind power/photovoltaics through the mixed Gaussian distribution of multiple random variables. Based on the distribution, the method of the present disclosure establishes the stochastic and dynamic unit commitment model with minimum cost expectation by considering deterministic constraints and chance constraints. The chance constraints limit the safety risk caused by the stochastic of the active power of the renewable energy power station such as wind power/photovoltaic to the certain confidence level during operation. At the same time, the Newton method is used to solve the quantile of the random variables obeying the mixed Gaussian distribution, thus transforming the chance constraints into the deterministic mixed integer linear constraints. The stochastic unit commitment model is analytically expressed as the mixed integer quadratic programming model. The result of the optimization is the optimal dispatch decision of the on-off and active power of the conventional thermal power unit and the active power of the renewable energy power station such as wind power/photovoltaic, under the control of operational risk and reduced operating costs. The advantage of the method of the present disclosure, is that the Newton method is used to transform the chance constraints containing the risk level and the random variables into the deterministic mixed integer linear constraints, which effectively improves the efficiency of solving the model. Meanwhile, the model with chance constraints and with adjustable risk level eliminates the conservative nature of the conventional robust unit commitment, to provide a more reasonable dispatch basis for decision makers. The method of the present disclosure may be employed to the stochastic and dynamic unit commitment of the power system with large-scale renewable energy integration.

DETAILED DESCRIPTION

The stochastic dynamical unit commitment method for a power system based on solving quantiles via Newton method, provided by the present disclosure, may include the following steps.

(1) A stochastic dynamical unit commitment model with chance constraints based on solving quantiles of random variables via Newton method is established. The stochastic and dynamic unit commitment model includes an objective function and constraints. The establishing may include the following steps.

(1-1) The objective function of the stochastic dynamical unit commitment model with chance constraints based on solving quantiles of random variables via Newton method is established.

The objective function is to minimize a sum of power generation costs and on-off costs of thermal power generating units. The objective function is denoted by a formula of:

$$\min \sum_{t=1}^{T} \left[ \sum_{i=1}^{N_G} (CF_i(P_i^t) + CU_i^t + CD_i^t) \right],$$

where, T denotes the number of dispatch intervals; $N_G$ denotes the number of thermal power generating units in the power system; t denotes a serial number of dispatch intervals; i denotes a serial number of thermal power generating units; $P_i^t$ denotes an active power of thermal power generating unit i at dispatch interval t; $CF_i$ denotes a fuel cost function of thermal power generating unit t; $CU_i^t$ denotes a startup cost of thermal power generating unit i at dispatch interval i; and $CD_i^t$ denotes a shutdown cost of thermal power generating unit i at dispatch interval t.

(1-1) The fuel cost function of the thermal power generating unit is expressed as a quadratic function of the active power of the thermal power generating unit, which is denoted by a formula of:

$$CF_i(P_i^t) = a_i(P_i^t)^2 + b_i P_i^t + c_i.$$

where, $a_i$ denotes a quadratic coefficient of a fuel cost of thermal power generating unit i; $b_i$ denotes a linear coefficient of the fuel cost of thermal power generating unit i; $c_i$ denotes a constant coefficient of the fuel cost of thermal power generating unit i; and values of $a_i$, $b_i$, and $c_i$ may be obtained from a dispatch center.

The startup cost of the thermal power generating unit, and the shutdown cost of the thermal power generating unit are denoted by formulas of:

$$CU_i^t \geq U_i(v_i^t - v_i^{t-1})$$

$$CU_i^t \geq 0,$$

$$CD_i^t \geq D_i(v_i^{t-1} - v_i^t)$$

$$CD_i^t \geq 0$$

where, $v_i^t$ denotes a state of thermal power generating unit i at dispatch interval i; if $v_i^t = 0$, it represents that thermal power generating unit i is in an off state; if $v_i^t = 1$, it represents that thermal power generating unit i is in an on state; it is set that there is the startup cost when the unit is switched from the off state to the on state, and there is the shutdown cost when the unit is switched from the on state to the off state; $U_i$ denotes a startup cost when the thermal power generating unit i is turned on one time; and $D_i$ denotes a shutdown cost when the thermal power generating unit i is turned off one time.

(1-2) Constraints of the stochastic dynamical unit commitment model with chance constraint based on solving quantiles of random variables via Newton method may include the following.

(1-2-1) A power balance constraint of the power system, which is denoted by a formula of:

$$\sum_{i=1}^{N_G} P_i^t + \sum_{j=1}^{N_W} w_j^t = \sum_{m=1}^{N_D} d_m^t,$$

where, $P_i^t$ denotes a scheduled active power of thermal power generating unit i at dispatch interval t; $w_j^t$ denotes a scheduled active power of renewable energy power station j at dispatch interval t; $d_m^t$ denotes a size of load m at dispatch interval t; and $N_D$ denotes the number of loads in the power system.

(1-2-2) An upper and lower constraint of the active power of the thermal power generating unit in the power system, which is denoted by a formula of:

$$\underline{P}_i v_i^t \leq P_i^t \leq \overline{P}_i v_i^t,$$

where, $\underline{P}_i$ denotes an active power lower limit of thermal power generating unit i; $\overline{P}_i$ an active power upper limit of thermal power generating unit i; $v_i^t$ denotes the state of thermal power generating unit i at dispatch interval t; if $v_i^t = 0$, it represents that thermal power generating unit i is in an on state; and if $v_i^t = 1$, it represents that thermal power generating unit i is in an off state.

(1-2-3) A reserve constraint of the thermal power generating unit in the power system, which is denoted by a formula of:

$$P_i^t + r_i^{t+} \leq \overline{P}_i v_i^t$$

$$0 \leq r_i^{t+} \leq \overline{r}_i^+,$$

$$P_i^t - r_i^{t-} \geq \underline{P}_i v_i^t$$

$$0 \leq r_i^{t-} \leq \overline{r}_i^-$$

where, $r_i^{t+}$ denotes an upper reserve of thermal power generating unit i at dispatch interval t; $r_i^{t-}$ denotes a lower reserve of thermal power generating unit i at dispatch interval t; $\overline{r}_i^+$ denotes a maximum upper reserve of thermal power generating unit i at dispatch interval t; $\overline{r}_i^-$ denotes a maximum lower reserve of thermal power generating unit i at dispatch interval t; and the maximum upper reserve and the maximum lower reserve may be obtained from the dispatch center of the power system.

(1-2-4) A ramp constraint of the thermal power generating unit in the power system, which is denoted by a formula of:

$$P_i^t - P_i^{t-1} \geq -RD_i \Delta T - (2 - v_i^t - v_i^{t-1})\overline{P}_i,$$

$$P_i^t - P_i^{t-1} \leq RU_i \Delta T + (2 - v_i^t - v_i^{t-1})\overline{P}_i$$

where, $RU_i$ denotes upward ramp capacities of thermal power generating unit i, and $RD_i$ denotes downward ramp capacities of thermal power generating unit i, which are obtained from the dispatch center; and $\Delta T$ denotes an interval between two adjacent dispatch intervals.

(1-2-5) A constraint of a minimum continuous on-off period of the thermal power generating unit in the power system, and the expression is as follows.

A minimum interval for power-on and power-off switching of the thermal power generating unit is denoted by a formula of:

$$\sum_{t=k}^{k+UT_i-1} v_i^t \geq UT_i(v_i^k - v_i^{k-1}), \forall k = 2, \ldots, T - UT_i + 1$$

$$\sum_{t=k}^{T} \{v_i^t - (v_i^k - v_i^{k-1})\} \geq 0, \forall k = T - UT_i + 2, \ldots, T$$

$$\sum_{t=k}^{k+DT_i-1} (1 - v_i^t) \geq DT_i(v_i^{k-1} - v_i^k), \forall k = 2, \ldots, T - DT_i + 1$$

$$\sum_{t=k}^{T} \{1 - v_i^t - (v_i^{k-1} - v_i^k)\} \geq 0, \forall k = T - DT_i + 2, \ldots, T,$$

where, $UT_i$ denotes a minimum continuous startup period, and $DT_i$ denotes a minimum continuous shutdown period.

(1-2-6) A reserve constraint of the power system, which is denoted by a formula of:

$$Pr\left(\sum_{i=1}^{N_G} r_i^{t+} \geq \sum_{j=1}^{N_W} w_j^t - \sum_{j=1}^{N_W} \tilde{w}_j^t + R^+\right) \geq 1 - \varepsilon_r^+$$

$$Pr\left(\sum_{i=1}^{N_G} r_i^{t-} \geq \sum_{j=1}^{N_W} \tilde{w}_j^t - \sum_{j=1}^{N_W} w_j^t + R^-\right) \geq 1 - \varepsilon_r^-,$$

where, $\tilde{w}_j^t$ denotes an actual active power of renewable energy power station j at dispatch interval t; $w_j^t$ denotes a scheduled active power of renewable energy power station j at dispatch interval t; and $R^+$ and $R^-$ denote additional reserve demand representing the power system from the dispatch center; $\varepsilon_r^+$ denotes a risk of insufficient upward reserve in the power system; $\varepsilon_r^-$ denotes a risk of insufficient downward reserve in the power system; and $Pr(\cdot)$ denotes a probability of occurrence of insufficient upward reserve and a probability of occurrence of insufficient downward reserve. The probability of occurrence of insufficient upward reserve and the probability of occurrence of insufficient downward reserve may be obtained from the dispatch center.

(1-2-7) A branch flow constraint of the power system, which is denoted by a formula of:

$$Pr\left(\sum_{i=1}^{N_G} G_{l,i} \check{P}_i^t + \sum_{j=1}^{N_W} G_{l,j} \tilde{w}_j^t - \sum_{k=1}^{N_D} G_{l,m} d_m^t \leq L_l\right) \geq 1-\eta$$

$$Pr\left(\sum_{i=1}^{N_G} G_{l,i} \check{P}_i^t + \sum_{j=1}^{N_W} G_{l,j} \tilde{w}_j^t - \sum_{k=1}^{N_D} G_{l,m} d_m^t \geq -L_l\right) \geq 1-\eta,$$

where, $G_{l,i}$ denotes a power transfer distribution factor of branch l to the active power of thermal power generating unit i; $G_{l,j}$ denotes a power transfer distribution factor of branch l to the active power of renewable energy power station j; $G_{l,m}$ denotes a power transfer distribution factor of branch l to load m; each power transfer distribution factor may be obtained from the dispatch center; $L_l$ denotes an active power upper limit on branch l; and η denotes a risk level of an active power on the branch of the power system exceeding a rated active power upper limit of the branch, which is determined by a dispatcher.

(2) Based on the objective function and constraints of the stochastic and dynamic unit commitment model, the Newton method is employed to solve quantiles of random variables, which may include the following steps.

(2-1) The chance constraints are converted into deterministic constraints containing quantiles.

A general form of the chance constraints is denoted by a formula of:

$$Pr(c^T \tilde{w}^t + d^T x \leq e) \geq 1-p,$$

where, c and d denote constant vectors with $N_W$ dimension in the chance constraints; $N_W$ denotes the number of renewable energy power stations in the power system; e denotes constants in the chance constraints; p denotes a risk level of the chance constraints, which is obtained from the dispatch center in the power system; $\tilde{w}^t$ denotes an actual active power vector of all renewable enemy power stations at dispatch interval t; and x denotes a vector consisting of decision variables, and the decision variables are scheduled active powers of the renewable energy power stations and the thermal power generating units.

The above general form of the chance constraints is converted to the deterministic constraints containing the quantiles by a formula of:

$$e - d^T x \geq CDF_{c^T \tilde{w}^t}^{-1}(1-p), \text{ where, } CDF_{c^T \tilde{w}^t}^{-1}(1-p)$$

denotes quantiles when a probability of one-dimensional random variables $c^T \tilde{w}^t$ is equal to 1−p.

(2-2) A joint probability distribution of the actual active powers of all renewable energy power stations in the power system is set to satisfy the following Gaussian mixture model:

$$\tilde{w}^t = \{\tilde{w}_j^t \mid 1 \leq j \leq N_W\}$$

$$PDF_{\tilde{w}^t}(Y) = \sum_{s=1}^{n} \omega_s N\left(Y, \mu_s, \sum_s\right), \omega_s \geq 0$$

$$N(Y \mid \mu_s, \Sigma_s) = \frac{1}{(2\pi)^{N_W/2} \det(\sum_s)^{1/2}} e^{-\frac{1}{2}(Y-\mu_s)^T \Sigma_s^{-1}(Y-\mu_s)},$$

where, $\tilde{w}^t$ denotes a set of scheduled active powers of all renewable energy power stations in the power system; $\tilde{w}^t$ is a stochastic vector;

$$PDF_{\tilde{w}^t}(\cdot)$$

denotes a probability density function of the stochastic vector; Y denotes values of $\tilde{w}^t$; $N(Y, \mu_s, \Sigma_s)$ denotes the $s^{-th}$ component of the mixed Gaussian distribution; n denotes the number of components of the mixed Gaussian distribution; $\omega_s$ denotes a weighting coefficient representing the $s^{-th}$ component of the mixed Gaussian distribution and a sum of weighting coefficients of all components is equal to 1; $\mu_s$ denotes an average vector of the $s^{-th}$ component of the mixed Gaussian distribution; $\Sigma_s$ denotes a covariance matrix of the $s^{-th}$ component of the mixed Gaussian distribution; $\det(\Sigma_s)$ denotes a determinant of the covariance matrix $\Sigma_s$; and a superscript T indicates a transposition of matrix.

Thus, a nonlinear equation containing the quantiles $$CDF_{c^T \tilde{w}^t}^{-1}(1-p)$$

is obtained as follows:

$$\sum_{s=1}^{n} \omega_s \Phi\left(\frac{y - c^T \mu_s}{\sqrt{c^T \sum_s c}}\right) - (1-p) = 0,$$

where, $\Phi(\cdot)$ denotes a cumulative distribution function representing a one-dimensional standard Gaussian distribution; y denotes a simple expression representing the quantile;

$$y = CDF_{c^T \tilde{w}^t}^{-1}(1-p);$$

and $\mu_s$ denotes an average vector of the $s^{-th}$ component of the mixed. Gaussian distribution.

(2-3) Employing the Newton method, the nonlinear equation of step (2-2) is iteratively solved to obtain the quantiles $$CDF_{c^T \tilde{w}^t}^{-1}(1-p)$$

of the random variables $c^T \tilde{w}^t$. The specific algorithm steps are as follows.

(2-3-1) Initialization

An initial value of y is set to $y_0$, which is denoted by a formula of:

$$y_0 \max(c^T \mu_i, i \in \{1,2,\ldots,N_W\}).$$

(2-3-2) Iteration

A value of y is updated by a formula of $$y_{k+1} = y_k - \frac{CDF_{c^T \tilde{w}^t}^{-1}(y_k) - (1-p)}{PDF_{c^T \tilde{w}^t}(y_k)}, \text{ where, } CDF_{c^T \tilde{w}^t}^{-1}(y_k)$$

denotes quantiles when a probability of one-dimensional random variables $c^T \tilde{w}^t$ is equal to 1−p; $y_k$ denotes a value of y of a previous iteration; $y_{k+1}$ denotes a value of y of a current iteration, which is to be solved; and $$PDF_{c^T\tilde{w}^t}$$

denotes a probability density function representing the stochastic vector $c^T\tilde{w}^t$, which is denoted by a formula of:

$$PDF_{c^T\tilde{w}^t}(y) = \sum_{s=1}^{n} \omega_s \frac{1}{\sqrt{2\pi c^T \sum_s c}} e^{-\frac{(y-c^T\mu_s)^2}{2c^T\Sigma_s c}}.$$

(2-3-3) An allowable error of the iterative calculation ε is set; an iterative calculation result is judged based on the allowable error. If $$|CDF^{-1}_{c^T\tilde{w}^t}(y_{k+1}) - (1-p)| \le \varepsilon,$$

it is determined that the iterative calculation converges, and values of the quantiles $$CDF^{-1}_{c^T\tilde{w}^t}(1-p)$$

of the random variables are obtained; and if $$|CDF^{-1}_{c^T\tilde{w}^t}(y_{k+1}) - (1-p)| > \varepsilon,$$

it is returned to (2-2-2).

(3) Based on $$CDF^{-1}_{c^T\tilde{w}^t}(1-p)$$

in the step (2), an equivalent form $$CDF^{-1}_{c^T\tilde{w}^t}(1-p)$$

of the chance constraints in the step (1-2-6) and the step (1-2-7). The chance constraints may exist in both the step (1-2-6) and the step (1-2-7).

$$CDF^{-1}_{c^T\tilde{w}^t}(1-p)$$

is the result of the general expression of the abstracted chance constraints. Therefore, in the same way, the specific expression may be obtained from the abstract expression, thus transforming all the chance constraints into the deterministic linear constraints. Since other constraints are mixed integer linear constraints on optimization variables, the objective function is a quadratic function, and the stochastic unit commitment problem is transformed into an equivalent mixed integer quadratic programming problem. Using the commercial optimization software CPLEX, and using z branch and bound method, the stochastic unit commitment model including the objective function and the constraints in the step (1) is solved to obtain $v_i^t$, $P_i^t$, and $w_j^t$. $v_i^t$ is taken as a starting and stopping state of thermal power generating unit i at dispatch interval i; $P_i^t$ is taken as a scheduled active power of renewable energy power station j at dispatch interval t; and $w_j^t$ is taken as a reference active power of renewable energy power station j at dispatch interval t. Therefore, the stochastic and dynamic unit commitment with chance constraints may be solved based on Newton method for solving quantiles of random variables.

What is claimed is:

1. A stochastic dynamical unit commitment method for a power system based on solving quantiles via Newton method, comprising the following steps:

(1) establishing a stochastic dynamical unit commitment model with chance constraints based on solving quantiles of random variables via Newton method, the stochastic dynamical unit commitment model comprising an objective function and constraints, the establishing comprising:

(1-1) establishing the objective function of the stochastic dynamical unit commitment model with chance constraints based on solving quantiles of random variables via Newton method, the objective function for minimizing a sum of power generating costs and on-off costs of thermal power generating units by a formula of:

$$\min \sum_{t=1}^{T} \left[ \sum_{i=1}^{N_G} (CF_i(P_i^t) + CU_i^t + CD_i^t) \right],$$

where, T denoting the number of dispatch intervals t; $N_G$ denoting the number of thermal power generating units in the power system; t denoting a serial number of dispatch intervals; i denoting a serial number of thermal power generating units; $P_i^t$ denoting an active power of thermal power generating unit i at dispatch interval t; $CF_i$ denoting a fuel cost function of thermal power generating unit i; $CU_i^t$ denoting a startup cost of thermal power generating unit i at dispatch interval t; and $CD_i^t$ denoting a shutdown cost of thermal power generating unit i at dispatch interval t;

the fuel cost function of the thermal power generating unit being expressed as a quadratic function of the active power of the thermal power generating unit by a formula of:

$$CF_i(P_i^t) = a_i(P_i^t)^2 + b_i P_i^t + c_i,$$

where, $a_i$ denoting a quadratic coefficient of a fuel cost of thermal power generating unit i; $b_i$ denoting a linear coefficient of the fuel cost of thermal power generating unit i; $c_i$ denoting a constant coefficient of the fuel cost of thermal power generating unit i; and values of $a_i$, $b_i$, and $c_i$ being obtained from a dispatch center;

the startup cost of the thermal power generating unit, and the shutdown cost of the thermal power generating unit being denoted by formulas of:

$$CU_i^t \ge U_i(v_i^t - v_i^{t-1})$$

$$CU_i^t \ge 0$$

$$CD_i^t \ge D_i(v_i^{t-1} - v_i^t)$$

$$CD_i^t \ge 0,$$

where, $v_i^t$ denoting a state of thermal power generating unit i at dispatch interval t; in which, if $v_i^t=0$, it represents that thermal power generating unit i is in an off state; if $v_i^t=1$, it represents that thermal power generating unit i is in an on state; it is set that there is the startup cost when the unit is switched from the off state to the on state, and there is the shutdown cost when the unit is switched from the on state to the off state; $U_i$ denoting a startup cost when thermal power generating unit i is turned on one time; and $D_i$ denoting a shutdown cost when thermal power generating unit i is turned off one time;

(1-2) obtaining constraints of the stochastic dynamical unit commitment model with chance constraints based on solving quantiles of random variables via Newton method, comprising:

(1-2-1) obtaining a power balance constraint of the power system by a formula of:

$$\sum_{i=1}^{N_G} P_i^t + \sum_{j=1}^{N_W} w_j^t = \sum_{m=1}^{N_D} d_m^t,$$

where, $P_i^t$ denoting a scheduled active power of thermal power generating unit t at dispatch interval t; $w_j^t$ denoting a scheduled active power of renewable energy power station at dispatch interval t; $d_m^t$ denoting a size of load m at dispatch interval t; and $N_D$ denoting the number of loads in the power system;

(1-2-2) obtaining an upper and lower constraint of the active power of the thermal power generating unit in the power system by a formula of:

$$\underline{P}_i v_i^t \leq P_i^t \leq \overline{P}_i v_i^t,$$

where, $\underline{P}_i$ denoting an active power lower limit of thermal power generating unit i; $\overline{P}_i$ denoting an active power upper limit of thermal power generating unit i; $v_i^t$ denoting the state of thermal power generating unit a at dispatch interval t; in which if $v_i^t=0$, it represents that thermal power generating unit is in an on state; and if $v_i^t=1$, it represents that thermal power generating unit i is in an off state;

(1-2-3) obtaining a reserve constraint of the thermal power generating unit in the power system, by a formula of:

$$P_i^t + r_i^{t+} \leq \overline{P}_i v_i^t$$

$$0 \leq r_i^{t+} \leq \overline{r}_i^+$$

$$P_i^t - r_i^{t-} \geq \underline{P}_i v_i^t$$

$$0 \leq r_i^{t-} \leq \overline{r}_i^-,$$

where, $r_i^{t+}$ denoting an upper reserve of thermal power generating unit i at dispatch interval t; $r_i^{t-}$ denoting a lower reserve of thermal power generating unit i at dispatch interval t; $\overline{r}_i^+$ denoting a maximum upper reserve of thermal power generating unit i at dispatch interval t; $\overline{r}_i^-$ denoting a maximum lower reserve of thermal power generating unit i at dispatch interval t; and the maximum upper reserve and the maximum lower reserve being obtained from the dispatch center of the power system;

(1-2-4) obtaining a ramp constraint of the thermal power generating unit in the power system, by a formula of:

$$P_i^t - P_i^{t-1} \geq -RD_i \Delta T - (2 - v_i^t - v_i^{t-1})\overline{P}_i$$

$$P_i^t - P_i^{t-1} \leq RU_i \Delta T + (2 - v_i^t - v_i^{t-1})\overline{P}_i,$$

where, $RU_i$ denoting upward ramp capacities of thermal power generating unit i, $RD_i$ and denoting downward ramp capacities of thermal power generating unit i, which are obtained from the dispatch center; and $\Delta T$ denoting an interval between two adjacent dispatch intervals;

(1-2-5) obtaining a constraint of a minimum continuous on-off period of the thermal power generating unit in the power system, comprising:
obtaining a minimum interval for power-on and power-off switching of the thermal power generating unit by a formula of:

$$\sum_{t=k}^{k+UT_i-1} v_i^t \geq UT_i \ (v_i^k - v_i^{k-1}), \forall \ k = 2, \ldots, T - UT_i + 1$$

$$\sum_{t=k}^{T} \{v_i^t - (v_i^k - v_i^{k-1})\} \geq 0, \forall \ k = T - UT_i + 2, \ldots, T$$

$$\sum_{t=k}^{k+DT_i-1} (1 - v_i^t) \geq DT_i \ (v_i^{k-1} - v_i^k), \forall \ k = 2, \ldots, T - DT_i + 1$$

$$\sum_{t=k}^{T} \{1 - v_i^t - (v_i^{k-1} - v_i^k)\} \geq 0, \forall \ k = T - DT_i + 2, \ldots, T,$$

where, $UT_i$ denoting a minimum continuous startup period, and $DT_i$ denoting a minimum continuous shutdown period;

(1-2-6) obtaining a reserve constraint of the power system by a formula of:

$$Pr\left(\sum_{i=1}^{N_G} r_i^{t+} \geq \sum_{j=1}^{N_W} w_j^t - \sum_{j=1}^{N_W} \tilde{w}_j^t + R^+\right) \geq 1 - \varepsilon_r^+$$

$$Pr\left(\sum_{i=1}^{N_G} r_i^{t-} \geq \sum_{j=1}^{N_W} \tilde{w}_j^t - \sum_{j=1}^{N_W} w_j^t + R^-\right) \geq 1 - \varepsilon_r^-,$$

where, $\tilde{w}_j^t$ denoting an actual active power of renewable energy power station j at dispatch interval t; $w_j^t$ denoting a scheduled active power of renewable energy power station at dispatch interval t; $R^+$ and $R^-$ denoting additional reserve demand representing the power system from the dispatch center; $\varepsilon_r^+$ denoting a risk of insufficient upward reserve in the power system; $\varepsilon_r^-$ denoting a risk of insufficient downward reserve in the power system; and $Pr(\cdot)$ denoting a probability of occurrence of insufficient upward reserve and a probability of occurrence of insufficient downward reserve; the probability of occurrence of insufficient upward reserve and the probability of occurrence of insufficient downward reserve being obtained from the dispatch center;

(1-2-7) obtaining a branch flow constraint of the power system by a formula of $$Pr\left(\sum_{i=1}^{N_G} G_{l,i}\tilde{P}_i + \sum_{j=1}^{N_W} G_{l,j}\tilde{w}_j^t - \sum_{k=1}^{N_D} G_{l,m}d_m^t \leq L_l\right) \geq 1 - \eta$$

$$Pr\left(\sum_{i=1}^{N_G} G_{l,i}\tilde{P}_i + \sum_{j=1}^{N_W} G_{l,j}\tilde{w}_j^t - \sum_{k=1}^{N_D} G_{l,m}d_m^t \geq -L_l\right) \geq 1 - \eta,$$

where, $G_{l,i}$ denoting a power transfer distribution factor of branch l to the active power of thermal power generating unit i; $G_{l,j}$ denoting a power transfer distribution factor of branch l to the active power of renewable energy power station j; $G_{l,m}$ denoting a power transfer distribution factor of branch l to load m; each power transfer distribution factor being obtained from the dispatch center; $L_l$ denoting an active power upper limit on branch l; and $\eta$ denoting a risk level of an active power on the branch of the power system exceeding a rated active power upper limit of the branch, which is determined by a dispatcher;

(2) based on the objective function and constraints of the stochastic dynamical unit commitment model, employing the Newton method to solve quantiles of random variables, comprising:

(2-1) converting the chance constraints into deterministic constraints containing quantiles, comprising:

denoting a general form of the chance constraints by a formula of:

$$Pr(c^T \tilde{w}^t + d^T x \le e) \ge 1 - p,$$

where, c and d denoting constant vectors with $N_W$ dimension in the chance constraints; $N_W$ denoting the number of renewable energy power stations in the power system; e denoting constants in the chance constraints; P denoting a risk level of the chance constraints, which is obtained from the dispatch center in the power system; $\tilde{w}^t_j$ denoting an actual active power vector of all renewable energy power stations at dispatch interval t; and x denoting a vector consisting of decision variables, and the decision variables being scheduled active powers of the renewable energy power stations and the thermal power generating units;

converting the general form of the chance constraints to the deterministic constraints containing the quantiles, by a formula of:

$$e - d^T x \ge CDF^{-1}_{c^T \tilde{w}^t}(1-p), \text{ where, } CDF^{-1}_{c^T \tilde{w}^t}(1-p)$$

denoting quantiles when a probability of one-dimensional random variables $c^T \tilde{w}^t$ is equal to $1-p$;

(2-2) setting a joint probability distribution of the actual active powers of all renewable energy power stations in the power system to satisfy the following Gaussian mixture model:

$$\tilde{w}^t = \{\tilde{w}^t_j \mid 1 \le j \le N_W\}$$

$$PDF_{\tilde{w}^t}(Y) = \sum_{s=1}^{n} \omega_s N(Y, \mu_s, \Sigma_s), \omega_s \ge 0$$

$$N(Y \mid \mu_s, \Sigma_s) = \frac{1}{(2\pi)^{N_W/2} det(\Sigma_s)^{1/2}} e^{-\frac{1}{2}(Y-\mu_s)^T \Sigma_s^{-1}(Y-\mu_s)},$$

where, $\tilde{w}^t_j$ denoting a set of scheduled active powers of all renewable energy power stations in the power system; $\tilde{w}^t_j$ being a stochastic vector;

$$PDF_{\tilde{w}^t}(\cdot)$$

denoting a probability density function of the stochastic vector; Y denoting values of $\tilde{w}^t_j$; $N(Y, \mu_s, \Sigma_s)$ denoting the $s^{-th}$ component of the mixed Gaussian distribution; n denoting the number of components of the mixed Gaussian distribution; $\omega_s$ denoting a weighting coefficient representing the $s^{-th}$ component of the mixed Gaussian distribution and a sum of weighting coefficients of all components is equal to 1; $\mu_s$ denoting an average vector of the $s^{-th}$ component of the mixed Gaussian distribution; $\Sigma^s$ is denoting a covariance matrix of the $s^{-th}$ component of the mixed Gaussian distribution; $det(\Sigma_s)$ denoting a determinant of the covariance matrix $\Sigma_s$; and a superscript T indicating a transposition of matrix;

acquiring a nonlinear equation containing the quantiles $$CDF^{-1}_{c^T \tilde{w}^t}(1-p)$$

as follows:

$$\sum_{s=1}^{n} \omega_s \Phi\left(\frac{y - c^T \mu_s}{\sqrt{c^T \Sigma_s c}}\right) - (1-p) = 0,$$

where, $\Phi(\cdot)$ denoting a cumulative distribution function representing a one-dimensional standard Gaussian distribution; y denoting a simple expression representing the quantile;

$$CDF^{-1}_{c^T \tilde{w}^t}(1-p);$$

and $\mu_s$ denoting an average vector of the $s^{-th}$ component of the mixed Gaussian distribution;

(2-3) employing the Newton method, solving the nonlinear equation of step (2-2) iteratively to obtain the quantiles $$CDF^{-1}_{c^T \tilde{w}^t}(1-p)$$

of the random variables $c^T \tilde{w}^t$, comprising:

(2-3-1) initialization:

setting an initial value of y to $y_0$, by a formula of:

$$y_0 = \max(c^T \mu_i, i \in \{1, 2, \ldots, N_W\});$$

(2-3-2) iteration:

updating a value of y by a formula of:

$$y_{k+1} = y_k - \frac{CDF^{-1}_{c^T \tilde{w}^t}(y_k) - (1-p)}{PDF_{c^T \tilde{w}^t}(y_k)}, \text{ where, } CDF^{-1}_{c^T \tilde{w}^t}(y_k)$$

denoting quantiles when a probability of one-dimensional random variables $c^T \tilde{w}^t$ is equal to $1-p$; $y_k$ denoting a value of y of a previous iteration; $y_{k+1}$ denoting a value of y of a current iteration, which is to be solved; and $$PDF_{c^T \tilde{w}^t}$$

denoting a probability density function representing the stochastic vector $c^T \tilde{w}^t$, which is denoted by a formula of:

$$PDF_{c^T\tilde{w}^t}(y) = \sum_{s=1}^{n} \omega_s \frac{1}{\sqrt{2\pi c^T \Sigma_s c}} e^{-\frac{(y-c^T\mu_s)^2}{2c^T\Sigma_s c}};$$

(2-3-3) setting an allowable error ε of the iterative calculation; judging an iterative calculation result based on the allowable error, in which, if $$|CDF^{-1}_{c^T\tilde{w}^t}(y_{k+1}) - (1-p)| \le \varepsilon,$$

it is determined that the iterative calculation converges, and values of the quantiles $$CDF^{-1}_{c^T\tilde{w}^t}(1-p)$$

of the random variables are obtained; and if $$|CDF^{-1}_{c^T\tilde{w}^t}(y_{k+1}) - (1-p)| > \varepsilon,$$

it is returned to (2-2-2);

(3) obtaining an equivalent form $$CDF^{-1}_{c^T\tilde{w}^t}(1-p)$$

of the chance constraints in the step (1-2-6) and the step (1-2-7) based on $$CDF^{-1}_{c^T\tilde{w}^t}(1-p)$$

in the step (2); using a branch and bound method, solving the stochastic dynamical unit commitment model comprising the objective function and the constraints in the step (1) to obtain $v_i^t$, $P_i^t$, and $w_j^t$, in which, $v_i^t$ is taken as a starting and stopping state of thermal power generating unit i at dispatch interval t; $P_i^t$ is taken as a scheduled active power of renewable energy power station j at dispatch interval t; $w_j^t$ and is taken as a reference active power of renewable energy power station j at dispatch interval t, solving the stochastic dynamical unit commitment model with chance constraints based on solving quantiles via Newton method; and controlling the thermal power generating unit and the renewable energy power station in the power system based on the $v_i^t$, $P_i^t$, and $w_j^t$.

* * * * *